(12) United States Patent
Satoh et al.

(10) Patent No.: US 7,683,358 B2
(45) Date of Patent: Mar. 23, 2010

(54) RADIATION IMAGE READ-OUT APPARATUS

(75) Inventors: Kimihiko Satoh, Kanagawa-ken (JP);
Yasunori Ohta, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 630 days.

(21) Appl. No.: 11/226,341

(22) Filed: Sep. 15, 2005

(65) Prior Publication Data

US 2006/0054845 A1    Mar. 16, 2006

(30) Foreign Application Priority Data

Sep. 15, 2004    (JP)    ............................... 2004-267971

(51) Int. Cl.
*G03B 42/08*    (2006.01)
(52) U.S. Cl. .................. 250/587; 250/584; 250/586
(58) Field of Classification Search ................ 250/584, 250/586, 587; 116/73, 201, 202
See application file for complete search history.

(56) References Cited

U.S. PATENT DOCUMENTS

| 4,047,034 | A | * | 9/1977 | Auphan ..................... 250/354.1 |
| 4,616,129 | A | * | 10/1986 | Yamada et al. ............... 250/207 |
| 4,742,225 | A | * | 5/1988 | Chan .......................... 250/586 |
| 4,806,757 | A | * | 2/1989 | Kano et al. .................. 250/581 |
| 5,012,096 | A | * | 4/1991 | Takeda et al. ................ 250/584 |
| 5,412,215 | A | * | 5/1995 | Shuto et al. ............. 250/363.09 |
| 5,684,888 | A | * | 11/1997 | Vuylsteke .................... 382/128 |
| 5,780,857 | A | * | 7/1998 | Harju et al. ............... 250/458.1 |
| 6,417,518 | B2 | * | 7/2002 | Arakawa et al. ............. 250/587 |
| 2003/0132395 | A1 | * | 7/2003 | Livingston ............... 250/458.1 |

FOREIGN PATENT DOCUMENTS

| JP | 61140045 A | * | 6/1986 |
| JP | 2-71662 A | | 3/1990 |
| JP | 3-132644 A | | 6/1991 |
| JP | 7-31373 A | | 2/1995 |
| JP | 2000-284384 A | | 10/2000 |
| JP | 2001-100340 A | | 4/2001 |

* cited by examiner

*Primary Examiner*—David P Porta
*Assistant Examiner*—Casey Bryant
(74) *Attorney, Agent, or Firm*—Sughrue Mion, PLLC

(57) ABSTRACT

A reference light source produces a reference light having a predetermined light intensity. A sensitivity measuring device acquires a detection signal from an operation, in which the reference light having been produced by the reference light source is photoelectrically detected with the photomultiplier. The sensitivity measuring device measures a sensitivity of the photomultiplier in accordance with a relationship between the thus acquired detection signal and a reference signal, which has been set previously and which has a level in accordance with the predetermined light intensity of the reference light.

15 Claims, 2 Drawing Sheets

RADIATION IMAGE READ-OUT APPARATUS

BACKGROUND OF THE INVENTION

1. Field of the Invention

This invention relates to a radiation image read-out apparatus for performing a radiation image read-out operation by use of a photomultiplier.

2. Description of the Related Art

It has heretofore been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a light, which cause the stimulable phosphor sheet to emit light in proportion to the amount of energy stored on the stimulable phosphor sheet during exposure of the stimulable phosphor sheet to the radiation. The light emitted by the stimulable phosphor sheet, upon stimulation thereof, is photoelectrically detected and converted into an electric image signal by use of image read-out means, such as a photomultiplier (hereinbelow referred to as the PMT). The image signal is then processed and used for the reproduction of the radiation image of the object as a visible image on a recording material.

As for the PMT utilized in the radiation image recording and reproducing systems described above, the sensitivity (i.e., the level of an output signal with respect to a light intensity of incident light) of the PMT is determined by the level of an applied high voltage. However, even though PMT's are of an identical type, the characteristics vary for respective PMT's. The level of the high voltage required to obtain a desired sensitivity varies for the respective PMT's. Therefore, at the time of delivery of each of the radiation image recording and reproducing systems to a user, the level of the high voltage has heretofore been set appropriately for each of the radiation image recording and reproducing systems such that a desired sensitivity of the PMT is capable of being obtained. (The setting of the level of the high voltage is described in, for example, Japanese Unexamined Patent Publication Nos. 3(1991)-132644 and 2001-100340.)

However, recently, it has been found that the sensitivities of the PMT's become low due to the use of the PMT's. In particular, as for the PMT's utilized in the radiation image recording and reproducing systems described above, it has been found that, since a large anode current flows through each of the PMT's, the sensitivities of the PMT's become markedly low. FIG. 4 is a graph showing a relationship between a cumulative dose of radiation having been delivered to a stimulable phosphor sheet, i.e. a cumulative addition value of anode currents flowing through a PMT, and a sensitivity of the PMT. It has been experimentally found that, as illustrated in FIG. 4, in cases where the cumulative dose of the radiation becomes large, the sensitivity of the PMT becomes as low as approximately one tenth of the original sensitivity.

Therefore, in cases where the voltage applied across the PMT is set appropriately at the time of the delivery of the PMT to the user, the sensitivity of the PMT becomes low due to the use of the PMT. Accordingly, particularly, appropriate detection is not capable of being made with respect to the light having a low light intensity, which light is emitted from a site of the stimulable phosphor sheet having been exposed to a small dose of the radiation. Also, in cases where a visible image is reproduced from an image signal having been obtained with the PMT whose sensitivity has become low as described above, it is not always possible to discriminate only through the seeing of the reproduced visible image whether the image quality of the reproduced visible image is due to the lowering of the sensitivity of the PMT or is due to the original quality of the radiation image having been stored on the stimulable phosphor sheet. In such cases, there is the risk that an appropriate image diagnosis will not capable of being made.

Further, it is considered that the lowering of the sensitivity of the PMT depends upon the cumulative value of anode currents, which have flowed through the PMT. Therefore, the extent of the lowering of the sensitivity of the PMT is not capable of being detected accurately in accordance with only the period, for which the PMT has been used, or the number of times of the radiation image read-out operations, which have been performed by use of the PMT. (The aforesaid problems with regard to the detection of the extent of the lowering of the sensitivity of the PMT are described in, for example, Japanese Patent Publication No. 7(1995)-031373.)

SUMMARY OF THE INVENTION

The primary object of the present invention is to provide a radiation image read-out apparatus, wherein lowering of a sensitivity of a photomultiplier due to use of the photomultiplier is capable of being detected accurately.

Another object of the present invention is to provide a radiation image read-out apparatus, which is capable of operating such that, in cases where lowering of a sensitivity of a photomultiplier has occurred, a reproduced radiation image appropriate for an image diagnosis is capable of being obtained.

The present invention provides a radiation image read-out apparatus for performing a radiation image read-out operation, in which stimulating rays are irradiated to a stimulable phosphor sheet carrying a radiation image stored thereon, the stimulating rays causing the stimulable phosphor sheet to emit light in proportion to an amount of energy stored on the stimulable phosphor sheet during exposure of the stimulable phosphor sheet to radiation, and in which the light having been emitted by the stimulable phosphor sheet during exposure of the stimulable phosphor sheet to the stimulating rays is photoelectrically detected with a photomultiplier, the apparatus comprising:

i) a reference light source for producing a reference light having a predetermined light intensity, and ii) sensitivity measuring means for acquiring a detection signal from an operation, in which the reference light having been produced by the reference light source is photoelectrically detected with the photomultiplier, and measuring a sensitivity of the photomultiplier in accordance with a relationship between the thus acquired detection signal and a reference signal, which has been set previously and which has a level in accordance with the predetermined light intensity of the reference light.

The radiation image read-out apparatus in accordance with the present invention may be modified such that the apparatus further comprises warning means for giving a warning in cases where the measured sensitivity of the photomultiplier is outside a predetermined range.

Also, the radiation image read-out apparatus in accordance with the present invention may be modified such that the apparatus further comprises voltage correcting means for controlling a voltage applied across the photomultiplier, such that the level of the detection signal becomes close to the level of the reference signal.

Further, the radiation image read-out apparatus in accordance with the present invention may be modified such that the reference light source is a blue light emitting diode.

Furthermore, the radiation image read-out apparatus in accordance with the present invention may be modified such that the apparatus further comprises:

light intensity detecting means for detecting the light intensity of the reference light, and a feedback control circuit for controlling actuation of the reference light source in accordance with the light intensity of the reference light, which light intensity has been detected with the light intensity detecting means, such that the light intensity of the reference light is kept at the predetermined light intensity.

Also, the radiation image read-out apparatus in accordance with the present invention may be modified such that the apparatus further comprises attenuation means for attenuating the light intensity of the reference light having been produced by the reference light source, the photomultiplier detects the reference light having been attenuated by the attenuation means, and the light intensity detecting means detects the reference light before passing through the attenuation means.

Further, the radiation image read-out apparatus in accordance with the present invention may be modified such that the apparatus further comprises light splitting means for splitting the reference light, which has been produced by the reference light source, into a first split light and a second split light, the light splitting means splits the reference lights which has been produced by the reference light source, such that the light intensity of the second split light is higher than the light intensity of the first split light, the photomultiplier detects the first split light, and the light intensity detecting means detects the second split light.

Furthermore, the radiation image read-out apparatus in accordance with the present invention may be modified such that the apparatus further comprises a stimulating ray cut-off filter for cutting off the stimulating rays, which travel toward a photo cathode of the photomultiplier, the stimulating ray cut-off filter is capable of transmitting a light, which has wavelengths falling within a wavelength distribution range outside the wavelength distribution range of the light emitted by the stimulable phosphor sheet, and the reference light source produces the light, which has the wavelengths falling within the wavelength distribution range outside the wavelength distribution range of the light emitted by the stimulable phosphor sheet, as the reference light.

Also, the radiation image read-out apparatus in accordance with the present invention may be modified such that the apparatus further comprises:

light guiding means for guiding the photostimulated luminescence to a photo cathode of the photomultiplier, and a joining section for joining the light guiding means and the photo cathode of the photomultiplier with each other, the joining section being made from a joining material, which is capable of transmitting the reference light, and the reference light source is located within the joining section.

Further, the radiation image read-out apparatus in accordance with the present invention may be modified such that the apparatus further comprises:

light guiding means for guiding the photostimulated luminescence to a photo cathode of the photomultiplier, a joining section for joining the light guiding means and the photo cathode of the photomultiplier with each other, the joining section being made from a joining material, which is capable of transmitting the reference light, a light guiding member, whose one end face is connected to the joining section, and a closed housing, to which the other end face of the light guiding member is connected, the reference light source is located within the closed housing, and the reference light having been produced by the reference light source enters into the light guiding member from the other end face of the light guiding member.

The term "reference signal" as used herein means the signal having been obtained from the detection of the reference light by use of the photomultiplier in the state in which substantial lowering of the sensitivity of the photomultiplier has not occurred. For example, the reference signal may be obtained from the detection of the reference light by use of a new photomultiplier, which has not yet been used. Alternatively, the reference signal may be obtained from the detection of the reference light by use of a photomultiplier, which has already been used and has not yet suffered from the lowering of the sensitivity. As another alternative, the reference signal may be obtained from the detection of the reference light by use of a photomultiplier, which has suffered from the lowering of the sensitivity such that the extent of the lowering of the sensitivity falls within an allowable range with respect to the measurement of the sensitivity.

Also, the term "reference signal having a level in accordance with a predetermined light intensity of a reference light" as used herein means the signal described below. Specifically, for example, in cases where the reference light having been produced by the reference light source is directly detected with the photomultiplier, and the detection signal is thereby acquired, the term "reference signal having a level in accordance with a predetermined light intensity of a reference light" as used herein means the signal representing the level of the predetermined light intensity of the reference light described above. In cases where the reference light having been produced by the reference light source is attenuated with a predetermined attenuation rate, and the thus attenuated reference light is detected with the photomultiplier, the detection signal being thereby acquired, the term "reference signal having a level in accordance with a predetermined light intensity of a reference light" as used herein means the signal representing the level resulting from attenuation of the aforesaid predetermined light intensity with the predetermined attenuation rate described above.

Further, the term "joining light guiding means and a photo cathode of a photomultiplier with each other" as used herein embraces both the cases, wherein a light radiating face of the light guiding means and the photo cathode of the photomultiplier are joined directly with each other, and the cases, wherein the light radiating face of the light guiding means and the photo cathode of the photomultiplier are joined with each other with a member, such as a stimulating ray cut-off filter, intervening between the light radiating face of the light guiding means and the photo cathode of the photomultiplier.

As the light guiding member, whose one end face is connected to the joining section, for example, an optical fiber may be utilized. Alternatively, a member formed from an acrylic material, or the like, may be utilized as the light guiding member.

With the radiation image read-out apparatus in accordance with the present invention, the reference light source for producing the reference light having the predetermined light intensity is provided. The detection signal is acquired from the operation, in which the reference light having been produced by the reference light source is photoelectrically detected with the photomultiplier. Also, the sensitivity of the photomultiplier is measured in accordance with the relationship between the thus acquired detection signal and the reference signal, which has been set previously and which has the level in accordance with the predetermined light intensity of the reference light. Therefore, for example, in cases where the measurement of the sensitivity of the photomultiplier is performed periodically, the lowering of the sensitivity of the photomultiplier due to the use of the photomultiplier is capable of being detected accurately.

With the radiation image read-out apparatus in accordance with the present invention, wherein a warning is given in cases where the measured sensitivity of the photomultiplier is outside the predetermined range, the occurrence of the lowering of the sensitivity of the photomultiplier is capable of being found clearly.

The radiation image read-out apparatus in accordance with the present invention may be modified such that the voltage applied across the photomultiplier is controlled such that the level of the detection signal becomes close to the level of the reference signal. With the modification described above, in cases where the lowering of the sensitivity of the photomultiplier has occurred, a reproduced radiation image appropriate for an image diagnosis is capable of being obtained.

With the radiation image read-out apparatus in accordance with the present invention, wherein the reference light source is the blue light emitting diode, the time occurring from actuation of the reference light source to stabilization of the light intensity is capable of being kept short.

The radiation image read-out apparatus in accordance with the present invention may be modified such that the apparatus further comprises the light intensity detecting means for detecting the light intensity of the reference light, and the feedback control circuit for controlling the actuation of the reference light source in accordance with the light intensity of the reference light, which light intensity has been detected with the light intensity detecting means, such that the light intensity of the reference light is kept at the predetermined light intensity. With the modification described above, the reference light having the stable light intensity free from a change with the passage of time is capable of being obtained, and the sensitivity of the photomultiplier is capable of being measured more accurately.

Also, the radiation image read-out apparatus in accordance with the present invention may be modified such that the apparatus further comprises the stimulating ray cut-off filter for cutting off the stimulating rays, which travel toward the photo cathode of the photomultiplier. The stimulating ray cut-off filter is set such that it is capable of transmitting the light, which has the wavelengths falling within the wavelength distribution range outside the wavelength distribution range of the light emitted by the stimulable phosphor sheet. Also, in such cases, the reference light source is set such that it produces the light, which has the wavelengths falling within the wavelength distribution range outside the wavelength distribution range of the light emitted by the stimulable phosphor sheet, as the reference light. With the modification described above, flexibility of selection of the reference light source is capable of being kept wide, and a reference light source with a low cost is capable of being utilized.

Also, the radiation image read-out apparatus in accordance with the present invention may be modified such that the apparatus further comprises the light guiding means for guiding the photostimulated luminescence to the photo cathode of the photomultiplier, and the joining section for joining the light guiding means and the photo cathode of the photomultiplier with each other, the joining section being made from the adhesive agent, which is capable of transmitting the reference light. In such cases, the reference light source is located within the joining section. With the modification described above, the problems are capable of being prevented from occurring in that dust and dirt clings to the reference light source. Therefore, the reference light having the stable light intensity is capable of being detected with the photomultiplier.

Further, the radiation image read-out apparatus in accordance with the present invention may be modified such that the apparatus further comprises the light guiding means for guiding the photostimulated luminescence to the photo cathode of the photomultiplier, the joining section for joining the light guiding means and the photo cathode of the photomultiplier with each other, the joining section being made from the adhesive agent, which is capable of transmitting the reference light, the light guiding member, whose one end face is connected to the joining section, and the closed housing, to which the other end face of the light guiding member is connected. In such cases, the reference light source is located within the closed housing, and the reference light having been produced by the reference light source enters into the light guiding member from the other end face of the light guiding member. With the modification described above, the problems are capable of being prevented from occurring in that dust and dirt clings to the reference light source. Therefore, the reference light having the stable light intensity is capable of being detected with the photomultiplier.

DESCRIPTION OF THE PREFERRED EMBODIMENTS

The present invention will hereinbelow be described in further detail with reference to the accompanying drawings.

Figure 1:
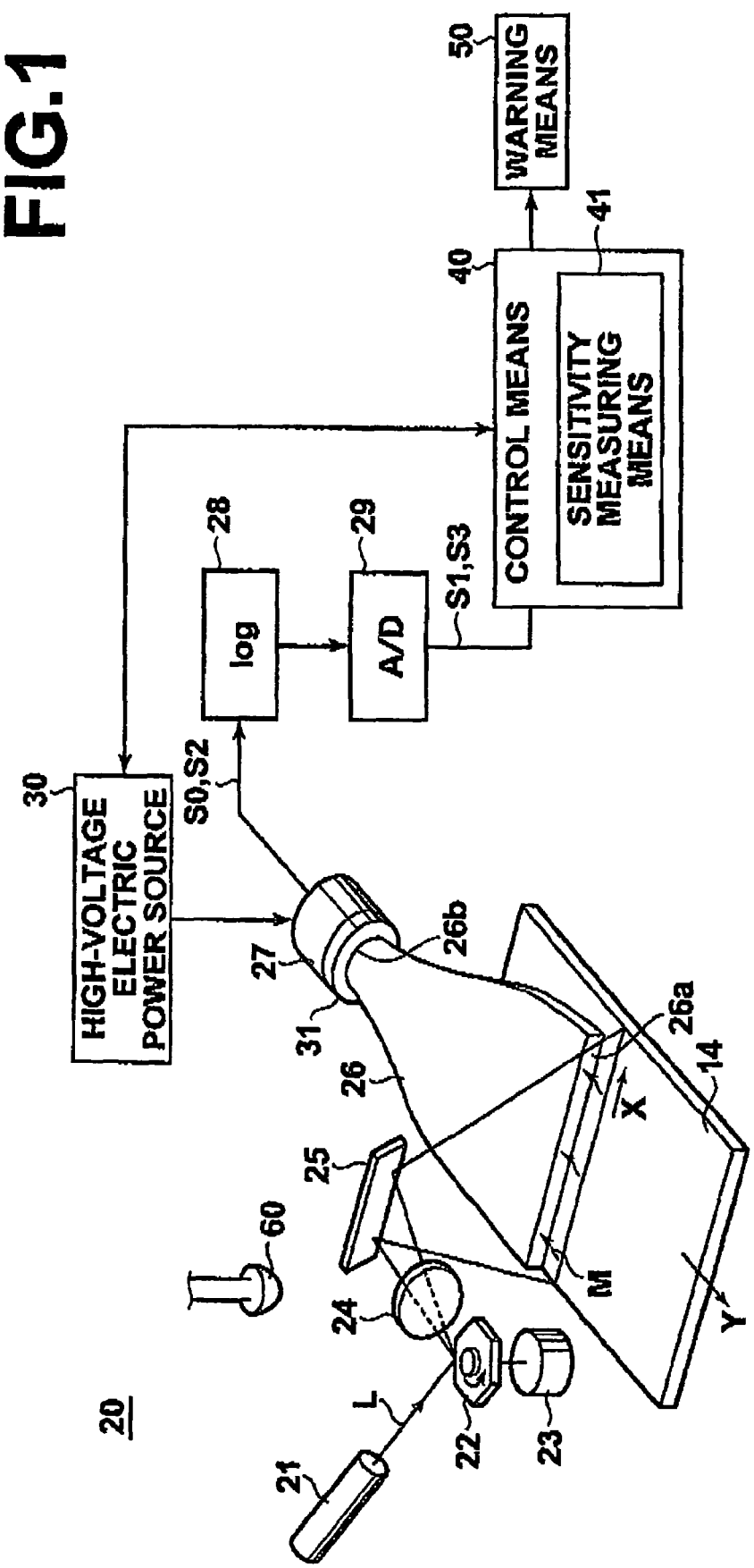
FIG. 1 is a schematic view showing an embodiment of the radiation image read-out apparatus in accordance with the present invention.

FIG. 1 is a schematic view showing an embodiment of the radiation image read-out apparatus in accordance with the present invention.

As illustrated in FIG. 1, a stimulable phosphor sheet 14, on which an X-ray image has been stored during exposure of the stimulable phosphor sheet 14 to X-rays carrying image information of an object, is subjected to a radiation image read-out operation performed by a radiation image read-out apparatus 20 in the manner described below.

Specifically, firstly, the stimulable phosphor sheet 14 is set at a predetermined position in the radiation image read-out apparatus 20. Thereafter, the stimulable phosphor sheet 14, which has been set at the predetermined position in the radiation image read-out apparatus 20, is conveyed in a sub-scanning direction indicated by the arrow Y by sheet conveyance means (not shown). Also, stimulating rays L are produced by a laser beam source 21. The stimulating rays L, which have been produced by the laser beam source 21, are reflected and deflected by a rotating polygon mirror 22, which is being quickly rotated by a motor 23 in the direction indicated by the arrow. The stimulating rays L then pass through a converging lens 24. The direction of the optical path of the stimulating rays L is then changed by a mirror 25. The stimulating rays L are thus caused to impinge upon the stimulable phosphor sheet 14 and scan the stimulable phosphor sheet 14 in a main scanning direction indicated by the arrow X. The main scanning direction is approximately normal to the sub-scanning direction indicated by the arrow Y.

When the stimulable phosphor sheet 14 is exposed to the stimulating rays L, the exposed portion of the stimulable phosphor sheet 14 is caused by the stimulating rays L to emit light M in an amount proportional to the amount of energy stored on the stimulable phosphor sheet 14 during the exposure of the stimulable phosphor sheet 14 to the X-rays. The emitted light M is guided by a light guide member 26 and photoelectrically detected by a PMT 27. The light guide member 26 is made from a light guiding material, such as an acrylic plate. The light guide member 26 has a linear light entry end face 26a. The light entry end face 26a of the light guide member 26 is located so as to extend along a main scanning line on the stimulable phosphor sheet 14. The light guide member 26 also has an annular light radiating end face 26b. The light radiating end face 26b of the light guide member 26 is located close to a photo cathode of the PMT 27 with a stimulating ray cut-off filter 31 intervening between the light radiating end face 26b of the light guide member 26 and the photo cathode of the PMT 27.

The emitted light M, which has entered into the light guide member 26 from the light entry end face 26a is guided through repeated total reflection within the light guide member 26 and radiated out from the light radiating end face 26b of the light guide member 26. The emitted light M, which has been radiated out from the light radiating end face 26b of the light guide member 26, passes through the stimulating ray cut-off filter 31 for filtering out the stimulating rays L. The emitted light M, which has passed through the stimulating ray cut-off filter 31, is received by the PMT 27. The emitted light M, which carries the X-ray image information, is thus converted by the PMT 27 into an analog image signal S0.

The analog image signal S0, which has been generated by the PMT 27, is fed into a logarithmic amplifier 28 and is logarithmically amplified by the logarithmic amplifier 28. The image signal having been obtained from the logarithmic amplifier 28 is fed into an analog-to-digital converter 29 and is converted by the analog-to-digital converter 29 into a digital image signal S1. The digital image signal S1 having thus been obtained is fed into control means 40. Thereafter, the digital image signal S1 is subjected to predetermined image processing performed by an image processing unit (not shown). The digital image signal S1 having thus been processed is utilized for reproducing a visible image on an image output device. The aforesaid operation of the radiation image read-out apparatus 20 is controlled in accordance with a control signal sent from the control means 40.

The radiation image read-out apparatus 20 is provided with a reference light source 60 for producing a reference light having a predetermined light intensity. Besides the radiation image read-out operation described above, a measurement of the sensitivity of the PMT 27 is performed by use of the reference light source 60. The measurement of the sensitivity of the PMT 27 may be performed in accordance with an instruction signal, which is given by the user of the radiation image read-out apparatus 20. Alternatively, the measurement of the sensitivity of the PMT 27 may be performed automatically and periodically. As another alternative, the measurement of the sensitivity of the PMT 27 may be performed at each of stages, at which the operation of the radiation image read-out apparatus 20 is started. Also, the instruction signal, which is given by the user of the radiation image read-out apparatus 20, may be inputted from an input device of the radiation image read-out apparatus 20. Alternatively, the instruction signal, which is given by the user of the radiation image read-out apparatus 20, may be inputted from an input device, such as a computer, which is connected to the radiation image read-out apparatus 20 via a network, or the like.

In cases where the measurement of the sensitivity of the PMT 27 is to be performed, the reference light source 60 is actuated in accordance with the control signal given by the control means 40. The reference light source 60 is thus actuated to produce the reference light having the predetermined light intensity. The reference light, which has been produced by the reference light source 60, enters into the light guide member 26 from the light entry end face 26a of the light guide member 26. The reference light is guided through the light guide member 26 and is radiated out from the light radiating end face 26b of the light guide member 26. The reference light, which has been radiated out from the light radiating end face 26b of the light guide member 26, passes through the stimulating ray cut-off filter 31 for filtering out the stimulating rays L and is received by the PMT 27. The reference light is thus photoelectrically converted by the PMT 27 into an analog detection signal S2.

The analog detection signal S2, which has been generated by the PMT 27, is fed into the logarithmic amplifier 28 and is logarithmically amplified by the logarithmic amplifier 28. The detection signal having been obtained from the logarithmic amplifier 28 is fed into the analog-to-digital converter 29 and is converted by the analog-to-digital converter 29 into a digital detection signal S3. The digital detection signal S3 having thus been obtained is fed into sensitivity measuring means 41 of the control means 40.

In the sensitivity measuring means 41, a reference signal, which has the level in accordance with the predetermined light intensity of the reference light, has been set previously. The reference signal is the digital signal having been obtained from an operation, wherein the reference light is detected by use of the PMT 27 in the state in which substantial lowering of the sensitivity of the PMT 27 has not occurred, and wherein the digital signal is then acquired in the same manner as that described above. The reference signal having thus been obtained is set previously in the sensitivity measuring means 41 before the digital detection signal S3 described above is acquired.

For example, the reference signal may be obtained from the detection of the reference light by use of the new PMT 27, which has not yet been used. Alternatively, the reference signal may be obtained from the detection of the reference light by use of the PMT 27, which has already been used and has not yet suffered from the lowering of the sensitivity. As another alternative, the reference signal may be obtained from the detection of the reference light by use of the PMT 27, which has suffered from the lowering of the sensitivity such that the extent of the lowering of the sensitivity falls within an allowable range with respect to the measurement of the sensitivity.

Also, the sensitivity measuring means 41 measures the sensitivity of the PMT 27 in accordance with a relationship between the digital detection signal S3, which has been acquired in the manner described above, and the reference signal. In order for the sensitivity of the PMT 27 to be measured in accordance with the relationship between the digital detection signal S3 and the reference signal, for example, a ratio of the digital detection signal S3 to the reference signal may be calculated. Alternatively, the sensitivity of the PMT 27 may be measured by use of one of various other known techniques for calculating the sensitivity.

Further, as illustrated in FIG. 1, the radiation image read-out apparatus 20 is provided with warning means 50. In cases where the sensitivity of the PMT 27 having been measured in the manner described above is outside a predetermined range, a signal, which represents that the sensitivity of the PMT 27 having been measured is outside the predetermined range, is fed out from the sensitivity measuring means 41 into the warning means 50. When the warning means 50 has received the signal, which represents that the sensitivity of the PMT 27 having been measured is outside the predetermined range, for example, the warning means 50 displays a message for requesting exchange of the PMT 27. Alternatively, in such cases, the warning means 50 may turn on a warning lamp, or the like. It may often occur that, after the sensitivity of the PMT 27 temporarily becomes high, the lowering of the sensitivity of the PMT 27 occurs markedly. Therefore, as described above, both the lower limit and the upper limit of the sensitivity of the PMT 27 are set.

As described above, with the radiation image read-out apparatus 20, the reference light source 60 for producing the reference light having the predetermined light intensity is provided. The detection signal is acquired from the operation, in which the reference light having been produced by the reference light source 60 is photoelectrically detected with the PMT 27. Also, the sensitivity of the PMT 27 is measured in accordance with the relationship between the thus acquired detection signal and the reference signal, which has been set previously and which has the level in accordance with the predetermined light intensity of the reference light. Therefore, for example, in cases where the measurement of the sensitivity of the PMT 27 is performed periodically, the lowering of the sensitivity of the PMT 27 due to the use of the PMT 27 is capable of being detected accurately.

In this embodiment of the radiation image read-out apparatus 20, an output voltage of a high-voltage electric power source 30 in accordance with the measured sensitivity of the PMT 27, such that the lowering of the sensitivity of the PMT 27 may be compensated for, and the sensitivity of the PMT 27 may thus be corrected.

As the reference light source 60, for example, an LED or an LD should preferably be employed. Also, in cases where the stimulable phosphor sheet 14 has the characteristics such that the stimulable phosphor sheet 14 emits the light having wavelengths falling within a blue light wavelength range, a blue LED may be employed as the reference light source 60. Alternatively, the reference light source 60 maybe constituted of a reference light source capable of producing the reference light having wavelengths falling within a wavelength range, which is other than the blue light wavelength range, and for which the stimulating ray cut-off filter 31 has a transmittance of at least 1%. For example, the reference light source 60 may be constituted of a reference light source capable of producing the reference light having wavelengths of an infrared wavelength region (e.g., wavelengths of at least 800 nm). As the reference light source capable of producing the reference light having wavelengths of the infrared wavelength region, for example, an infrared LED, which is available at a markedly low cost, is capable of being utilized.

Figure 2:
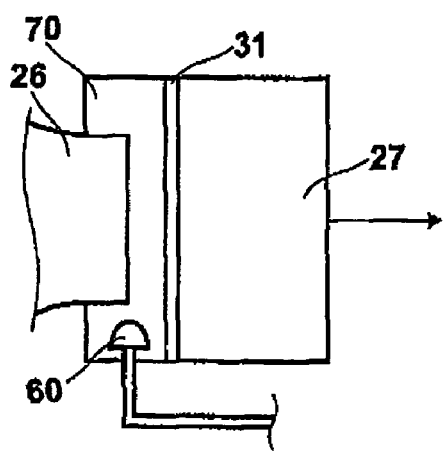
FIG. 2 is an enlarged view showing part of a different embodiment of the radiation image read-out apparatus in accordance with the present invention.

Furthermore, for example, as illustrated in FIG. 2, a joining section 70 for joining the light guide member 26 and the photo cathode of the PMT 27 with each other via the stimulating ray cut-off filter 31 may be made from a joining material, which is capable of transmitting the reference light. Also, the reference light source 60 may be located within the joining section 70. In cases where the reference light source 60 is thus enclosed within the joining section 70, the problems are capable of being prevented from occurring in that dust and dirt clings to the reference light source 60. Therefore, the reference light having the stable light intensity is capable of being detected with the PMT 27. As the adhesive agent described above, for example, a silicone type of a joining material may be utilized.

Figure 3:
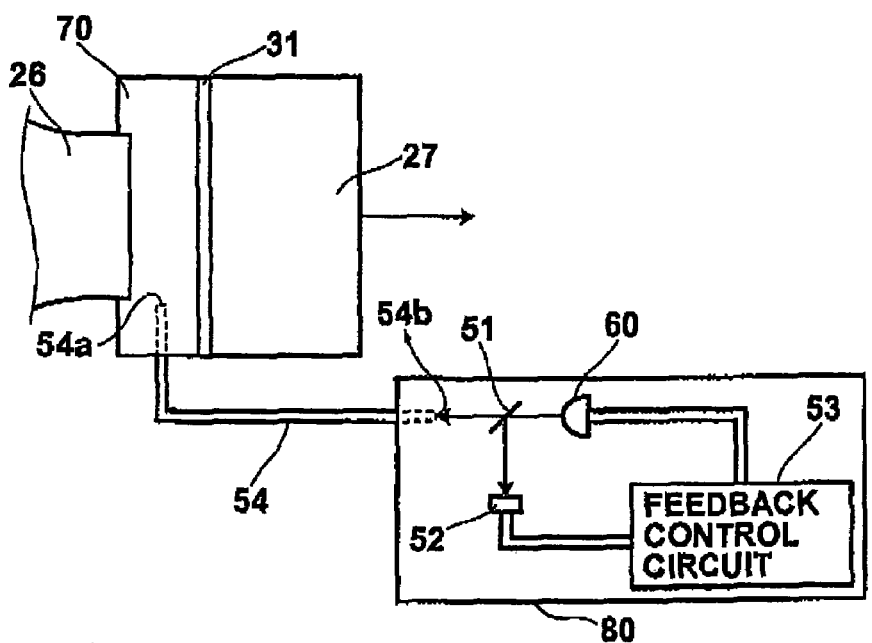
FIG. 3 is an enlarged view showing part of a further different embodiment of the radiation image read-out apparatus in accordance with the present invention.
Figure 4:
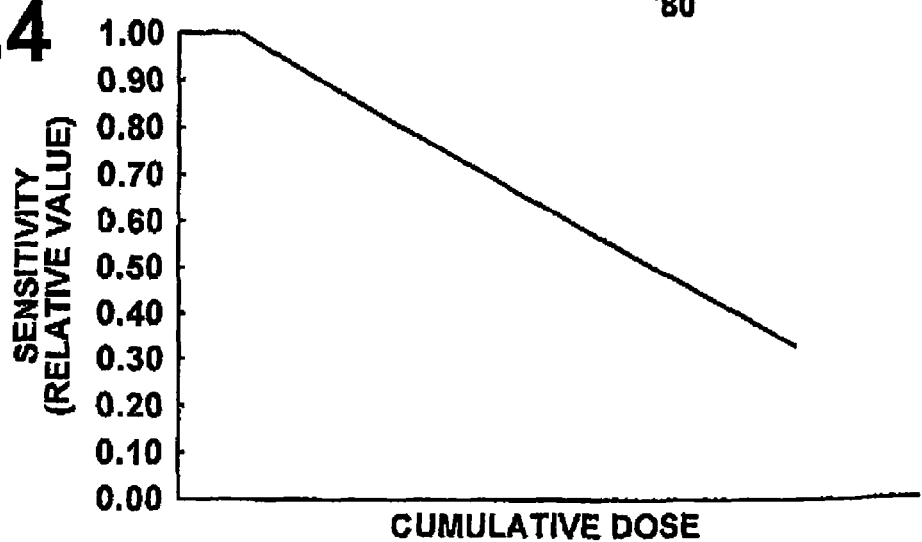
FIG. 4 is a graph showing how a sensitivity of a photomultiplier becomes low.

Further, as illustrated in FIG. 3, the joining section 70 may be formed in the same manner as that described above, and an optical fiber 54 maybe connected with the joining section 70, such that one end face 54a of the optical fiber 54 may be located within the joining section 70. Also, the other end face 54b of the optical fiber 54 may be connected with a closed housing 80. Further, the reference light having been produced by the reference light source 60, which is located within the housing 80, may be entered into the optical fiber 54 from the other end face 54b of the optical fiber 54. The reference light may thus be guided through the optical fiber 54, radiated out from the one end face 54a of the optical fiber 54, and detected with the PMT 27.

Furthermore, as illustrated in FIG. 3, a photodiode 52 for detecting the light intensity of the reference light and a feed-back control circuit 53 may be located within the housing 80. The feedback control circuit 53 controls the actuation of the reference light source 60 in accordance with the light intensity of the reference light, which light intensity has been detected with the photodiode 52, such that the light intensity of the reference light produced by the reference light source 60 is kept at the predetermined light intensity. As illustrated in FIG. 3, a dichroic mirror 51 is located within the housing 80. Of the reference light having been produced by the reference light source 60, reflected light having been reflected from the dichroic mirror 51 is detected by the photodiode 52, and transmitted light having passed through the dichroic mirror 51 impinges upon the other end face 54b of the optical fiber 54. In such cases, the light intensity of the reflected light having been reflected from the dichroic mirror 51 should preferably be set to be sufficiently higher than the light intensity of the transmitted light having passed through the dichroic mirror 51. For example, the transmittance of the dichroic mirror 51 with respect to the reference light should preferably be approximately 1%. In cases where the light intensity of the reflected light having been reflected from the dichroic mirror 51 is thus set to be sufficiently higher than the light intensity of the transmitted light having passed through the dichroic mirror 51, the control of the light intensity of the reference light performed by the feedback control circuit 53 is capable of being performed more reliably. By way of example, a filter for attenuating the light intensity of the reference light having passed through the dichroic mirror 51 may be located between the dichroic mirror 51 and the other end face 54b of the optical fiber 54.

In the radiation image read-out apparatus 20 described above, the level of the voltage applied to the PMT 27 is corrected in accordance with the lowering of the sensitivity of the PMT 27. Alternatively, the correction of the level of the voltage applied to the PMT 27 may be made with the lowering of the sensitivity of the stimulable phosphor sheet 14 being taken into consideration. Specifically, for example, the stimulable phosphor sheet 14 may be provided with a bar code, an IC chip, or the like. Also, information representing the extent of the lowering of the sensitivity of the stimulable phosphor sheet 14 may be stored with the bar code, the IC chip, or the like, which is appended to the stimulable phosphor sheet 14. Examples of the information representing the extent of the lowering of the sensitivity of the stimulable phosphor sheet 14 include the information representing the number of radiation image recording operations, which have been performed on the stimulable phosphor sheet 14, and the information representing the number of radiation image read-out operations, which have been performed on the stimulable phosphor sheet 14. Further, a voltage value for compensation for the lowering of the sensitivity of the stimulable phosphor sheet 14 may be set previously in the control means 40. Furthermore, a voltage value in accordance with the lowering of the sensitivity of the PMT 27 may be calculated in accordance with the aforesaid information representing the extent of the lowering of the sensitivity of the stimulable phosphor sheet 14 and may be utilized for the correction of the level of the voltage applied to the PMT 27.

What is claimed is:

1. A radiation image read-out apparatus configured to perform a radiation image read-out operation, in which stimulating rays are irradiated to a stimulable phosphor sheet carrying a radiation image stored thereon, the stimulating rays causing the stimulable phosphor sheet to emit light in proportion to an amount of energy stored on the stimulable phosphor sheet during exposure of the stimulable phosphor sheet to radiation, and in which the light having been emitted by the stimulable phosphor sheet during exposure of the stimulable phosphor sheet to the stimulating rays is photoelectrically detected with a photomultiplier, the apparatus comprising:

a reference light source configured to produce a reference light having a predetermined light intensity, sensitivity measuring means for acquiring a detection signal from an operation, in which the reference light having been produced by the reference light source is photoelectrically detected with the photomultiplier, and measuring a sensitivity of the photomultiplier in accordance with a relationship between the thus acquired detection signal and a reference signal, which has been set previously and which has a level in accordance with the predetermined light intensity of the reference light; and warning means for giving a warning in cases where the measured sensitivity of the photomultiplier is outside a predetermined range; and wherein the apparatus further comprises a stimulating ray cut-off filter configured to cut off the stimulating rays, which travel toward a photo cathode of the photomultiplier, the stimulating ray cut-off filter has a transparency range outside the wavelength band of the photostimulated emission, and the reference light source emits the reference light in said transparency range.

2. An apparatus as defined in claim 1 wherein the apparatus further comprises voltage correcting means for controlling a voltage applied across the photomultiplier, such that the level of the detection signal becomes close to the level of the reference signal.

3. An apparatus as defined in claim 1 wherein the reference light source is a blue light emitting diode.

4. An apparatus as defined in claim 1 wherein the apparatus further comprises:

light guiding means for guiding the photostimulated luminescence to a photo cathode of the photomultiplier, and a joining section configured to join the light guiding means and the photo cathode of the photomultiplier with each other, the joining section being made from a joining material, which is capable of transmitting the reference light and the photostimulated emission, and the reference light source is located within the joining section.

5. An apparatus as defined in claim 1 wherein the apparatus further comprises:

light guiding means for guiding the photostimulated emission to a photo cathode of the photomultiplier, a joining section configured to join the light guiding means and the photo cathode of the photomultiplier with each other, the joining section being made from a joining material, which is capable of transmitting the reference light, a light guiding member with a first end face and a second end face, whose first end face is connected to the joining section, and a closed housing, to which the second end face of the light guiding member is connected, the reference light source is located within the closed housing, and the reference light having been produced by the reference light source enters into the light guiding member from the second end face of the light guiding member.

6. An apparatus as defined in claim 1, wherein the reference signal is obtained from the detection of the reference light by use of a photomultiplier which has not had its sensitivity lowered from use.

7. An apparatus as defined in claim 1, wherein the reference signal is obtained from the detection of the reference light by use of a photomultiplier which has had its sensitivity lowered from use, wherein the extent of the lowering of the sensitivity falls within a predetermined range with respect to the measurement of the sensitivity.

8. An apparatus as defined in claim 1, wherein the reference signal is generated by photoelectrically detecting the reference light with the photomultiplier before the sensitivity of the photomultiplier has been significantly reduced.

9. An apparatus as defined in claim 1, wherein the operation from which the detection signal is acquired is performed when the sensitivity of the photomultiplier has been significantly reduced.

10. A radiation image read-out apparatus configured to perform a radiation image read-out operation, in which stimulating rays are irradiated to a stimulable phosphor sheet carrying a radiation image stored thereon, the stimulating rays causing the stimulable phosphor sheet to emit light in proportion to an amount of energy stored on the stimulable phosphor sheet during exposure of the stimulable phosphor sheet to radiation, and in which the light having been emitted by the stimulable phosphor sheet during exposure of the stimulable phosphor sheet to the stimulating rays is photoelectrically detected with a photomultiplier, the apparatus comprising:

a reference light source configured to produce a reference light having a predetermined light intensity, sensitivity measuring means for acquiring a detection signal from an operation, in which the reference light having been produced by the reference light source is photoelectrically detected with the photomultiplier, and measuring a sensitivity of the photomultiplier in accordance with a relationship between the thus acquired detection signal and a reference signal, which has been set previously and which has a level in accordance with the predetermined light intensity of the reference light;

light intensity detecting means for detecting the light intensity of the reference light, and feedback control means for controlling actuation of the reference light source in accordance with the light intensity of the reference light, which light intensity has been detected with the light intensity detecting means, such that the light intensity of the reference light is kept at the predetermined light intensity; and wherein the apparatus further comprises a stimulating ray cut-off filter configured to cut off the stimulating rays, which travel toward a photo cathode of the photomultiplier, the stimulating ray cut-off filter has a transparency range outside the wavelength band of the photostimulated emission, and the reference light source emits the reference light in said transparency range.

11. An apparatus as defined in claim 10 wherein the apparatus further comprises attenuation means for attenuating the light intensity of the reference light having been produced by the reference light source, the photomultiplier detects the reference light having been attenuated by the attenuation means, and the light intensity detecting means detects the reference light before passing through the attenuation means.

12. An apparatus as defined in claim 10 wherein the apparatus further comprises light splitting means for splitting the reference light, which has been produced by the reference light source, into a first split light and a second split light, the light splitting means splits the reference light, which has been produced by the reference light source, such that the light intensity of the second split light is higher than the light intensity of the first split light, the photomultiplier detects the first split light, and the light intensity detecting means detects the second split light.

13. An apparatus as defined in claim 10, wherein the intensity detecting means is separate and distinct from the photomultiplier and the sensitivity measuring means.

14. An apparatus as defined in claim 10, wherein the light intensity detecting means are separate and distinct from the photomultiplier.

15. A radiation image read-out apparatus configured to perform a radiation image read-out operation, in which stimulating rays are irradiated to a stimulable phosphor sheet carrying a radiation image stored thereon, the stimulating rays causing the stimulable phosphor sheet to emit light in proportion to an amount of energy stored on the stimulable phosphor sheet during exposure of the stimulable phosphor sheet to radiation, and in which the light having been emitted by the stimulable phosphor sheet during exposure of the stimulable phosphor sheet to the stimulating rays is photoelectrically detected with a light-detecting element, the apparatus comprising:

a reference light source configured to produce a reference light having a predetermined light intensity, sensitivity measuring means for acquiring a detection signal from an operation, in which the reference light having been produced by the reference light source is photoelectrically detected with the light-detecting element, and measuring a sensitivity of the photomultiplier in accordance with a relationship between the thus acquired detection signal and a reference signal, which has been set previously and which has a level in accordance with the predetermined light intensity of the reference light;

light intensity detecting means for detecting the light intensity of the reference light, and feedback control means for controlling actuation of the reference light source in accordance with the light intensity of the reference light, which light intensity has been detected with the light intensity detecting means, such that the light intensity of the reference light is kept at the predetermined light intensity; and wherein the apparatus further comprises a stimulating ray cut-off filter configured to cut off the stimulating rays, which travel toward the light-detecting element, the stimulating ray cut-off filter has a transparency range outside the wavelength band of the photostimulated emission, and the reference light source emits the reference light in said transparency range.

* * * * *